Sept. 11, 1962    J. C. DE SHAZOR, JR    3,053,010
SALES CONTAINER FOR YOUNG PLANTS
Filed May 16, 1960
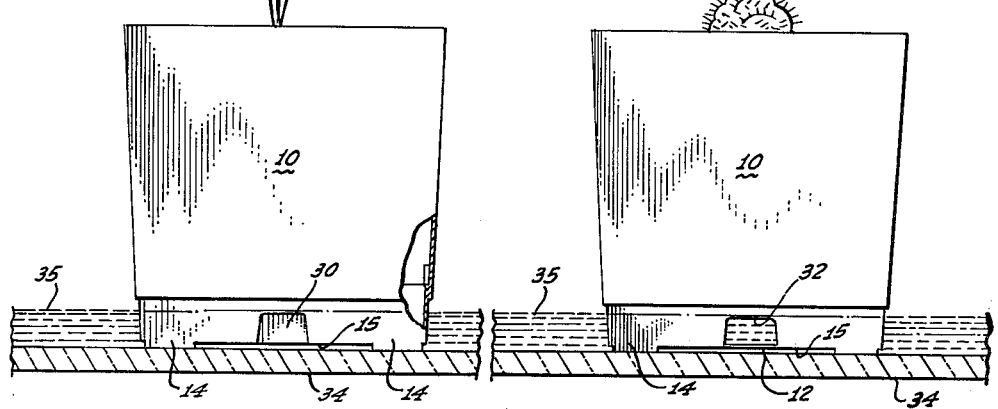
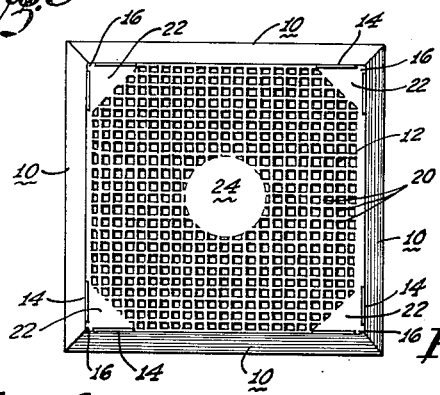
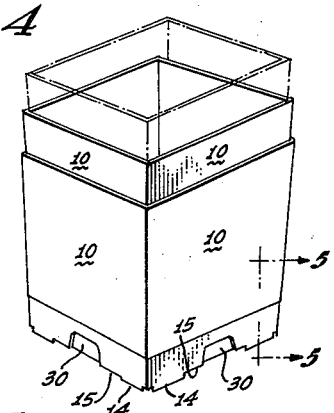
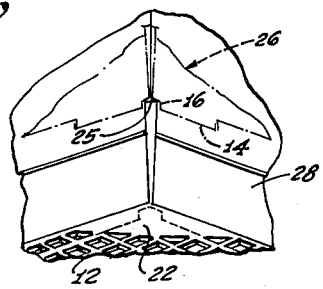
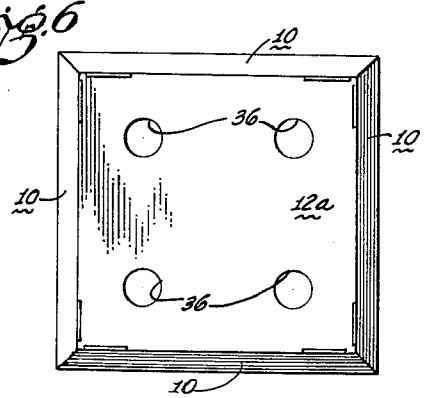
INVENTOR:
James E. DeShazor, Jr.
By Smyth, Roston & Pavitt
Attorneys.

United States Patent Office 3,053,010
Patented Sept. 11, 1962

3,053,010
SALES CONTAINER FOR YOUNG PLANTS
James C. De Shazor, Jr., Gardena, Calif., assignor, by mesne assignments, to Plan-O-Bans Corporation, San Francisco, Calif., a corporation of California
Filed May 16, 1960, Ser. No. 29,500
7 Claims. (Cl. 47—34)

This invention relates to a receptacle for growing young plants and, more particularly, refers to such a receptacle for not only growing young plants, but also for handling, displaying and selling the young plants in self-service stores.

It is a common practice to use small inexpensive receptacles to grow plants from seeds or cuttings for sale at nurseries and other retail establishments where the receptacles are carefully handled entirely by the sales personnel. The receptacles are usually made of cardboard or of thin wood, such as commonly used for berry boxes. During the growing period at the nursery, the receptacles stand on a support surface, for example on a sheet of glass, and the support surface is periodically flooded with liquid nutrient which enters the receptacles through side openings near the bottoms thereof.

There are several disadvantages in the use of prior art receptacles made of cardboard and thin wood. Cardboard usually has a sulphur content which is harmful to growing plants. The bottoms of containers of cardboard and thin wood usually become infested with wire worms. These two materials, moreover, absorb water excessively with consequent swelling, warpage and structural deterioration. The two materials are further subject to deterioration by the action of chemicals commonly found in soils, fertilizers and nutrients. In addition, cardboard and wood are both susceptible to fungi. By the time the plants are ready for sale, the receptacles made of cardboard and wood are unsightly, being badly stained and badly out of shape. The receptacles are so weakened and deteriorated that they must be handled with great care. They are especially unsuited for sales purposes in self-service stores because they are not durable enough to withstand handling by customers who wait on themselves and also because the containers completely lack sales appeal.

A further and most serious disadvantage of the use of a prior art receptacle for the present purpose is that the receptacle has a sufficiently large bottom opening to permit the major root of the plant to extend through the bottom of the container. Such a container is transferred to a field for an appropriate period of time to "harden" the plant and thus give the plant the ability to withstand handling. At the end of the "hardening" period when the plant is removed from the field, is all the root structure that extends through the bottom wall is removed. The removal of a portion of a major root at this time greatly weakens the plant with the consequence that the plant is usually at least partially wilted when placed on sale.

The present invention corrects this situation by providing a non-deteriorating plastic receptacle which may be resused if desired, but which is actually so inexpensive that it may be regarded as a disposable receptacle. The receptacle may be molded from polystyrene which does not absorb appreciable moisture, even under prolonged submersion. This plastic material has strength, dimensional stability and unfading color. It is immune to chemicals found in soil, fertilizer and nutrients. In addition, it not only resists fungi, but also effectively repels wire worms.

In the preferred practice of the invention, the receptacle is molded in one piece with four thin flexible side walls and a perforated bottom wall. Portions of the four side walls extend below the perforated bottom wall at the four corners to provide a base portion so that when the receptacle is placed on a support surface, the base portion spaces the perforated bottom of the receptacle above the support surface. This base portion is open to admit liquid nutrient into the space under the perforated bottom and through the perforated bottom into the interior of the receptacle when the receptacle stands on a support surface and the support surface is flooded with liquid nutrient.

It has been discovered that if the bottom of the receptacle has numerous small perforations no larger than $5/32$ of an inch in dimension, the major roots of the plant are prevented from extending through the bottom. Only hair roots can extend through such small perforations and severing or scraping off the hair roots does not affect the vitality of a plant to any appreciable or significant extent. In the preferred practice of the invention, therefore, the bottom wall is a perforated wall of the character of a screen having openings no larger than $5/32$ of an inch. In actual practice, the openings may be as small as $1/16$ of an inch for relativey small receptacles, say receptacles approximately two inches wide, and may be $1/8$ of an inch in dimension in larger receptacles, say receptacles up to six inches wide.

The selected embodiment of the invention further provides for openings in the side walls of the container immediately above the perforated bottom for additional inflow of liquid nutrient during feeding periods and, more important, for aeration of the lower interior of the receptacle between feeding periods. Preferably, these additional side openings are provided by weakened knock-outs which may be easily removed by finger pressure at the option of the user.

Certain problems arise in the storing and shipping of such receptacles prior to use. It is essential to save space in the storing and shipping of the empty receptacles and, therefore, it is desirable to taper the receptacles to nest together. Unfortunately, however, when tapered plastic receptacles are stacked together in this manner, they wedge together and it becomes a troublesome and time-consuming matter to pull them apart for individual use.

The invention meets these problems by providing internal shoulders in tapered receptacles to serve as stops for the nested receptacles. When one receptacle is telescoped into a second receptacle, it abuts one or more such internal shoulders in the second receptacle to keep it from reaching a wedging position.

The features and advantages of the invention may be understood by reference to the following detailed description and the accompanying drawing.

In the drawing, which is to be regarded as merely illustrative:

FIG. 1 is a side elevational view of a selected embodiment of the invention showing the receptacle standing on a support surface with the support surface flooded with liquid nutrient for feeding the growing plant in the receptacle;

FIG. 2 is a similar view with a knock-out portion removed to provide an opening in the side of the receptacle immediately above its perforated bottom to facilitate the inflow of the liquid nutrient during feeding periods and to provide for aeration of the lower interior of the receptacle between the feeding periods;

FIG. 3 is a bottom view of the receptacle showing the structure of the perforated bottom wall;

FIG. 4 is a perspective view showing the manner in which a plurality of receptacles may be nested together for compactness during storage and shipment prior to use;

FIG. 5 is a section taken as indicated by the line 5—5 of FIG. 4 and showing in perspective a stop shoulder inside a receptacle to prevent wedging of a nested receptacle; and FIG. 6 is a bottom view similar to FIG. 3 showing how the bottom wall may be formed with a few relatively large openings instead of being formed with numerous small openings.

The selected embodiment of the invention shown in FIGS. 1 to 5 is a receptacle of molded polystyrene which may be of a suitable pleasing color. Since the receptacle is relatively small, being on the order of the size of a common teacup, and since it is molded with thin flexible walls, the material cost is exceedingly low and, of course the other costs are also exceedingly low since the device may be molded on a mass production basis.

The receptacle is rectangular in plan rather than circular in this particular practice of the invention to make it possible to arrange the receptacles compactly on a support surface or in a tray for transportation. The receptacle shown in the drawing has four thin side walls 10, a perforate bottom wall 12 and a suitable base portion for elevating the perforate bottom wall. In the construction shown, the base portion, which is indicated by numeral 14, is formed by extending the side walls 10 downward below the perforate bottom wall 12.

It is essential that the base portion 14 be open on at least one of its sides for admission of liquid nutrient to the space below the perforate bottom wall 12 when the receptacle is placed on a support surface and the support surface is flooded with the liquid nutrient. Preferably a plurality of side openings is provided in the base portion to permit the liquid nutrient to circulate through the base portion. In the construction shown, each of the four sides of the base portion 14 is cut away along its bottom edge to form a laterally extensive recess 15, the vertical dimension of which is substantially equal to the distance of the perforate bottom wall 12 above the lower edge of the base portion. In addition, smaller recesses or notches 16 of substantially the same vertical dimension may be provided at each of the four corners of the receptacle. As may be seen in FIGS. 3 and 4, this construction makes the base portion 14 comprise two downwardly extending narrow feet at each corner of the receptacle.

In this embodiment of the invention, the perforate bottom wall 12 is formed with successive rows of small rectangular perforations 20 which give the bottom wall the character of a screen for the free transmission of liquids therethrough. In this instance, the rectangular perforations 20 are approximately $\frac{1}{16}$ of an inch wide and are spaced $\frac{1}{32}$ of an inch apart. In the construction shown, a portion of the bottom wall 12 is left blank at each corner of the receptacle to form a triangular web 22 at each corner for reinforcement and to brace the receptacle structure against deformation out of its rectangular configuration. Preferably, an additional central portion is left blank to form a central web 24 for strength in the central region of the bottom wall.

The receptacle is of tapered configuration with each of the four side walls 10 inclining outward from the vertical. This tapered configuration makes it possible to nest the receptacles compactly together, as shown in FIG. 4, for storage and shipment prior to use. To prevent the nested receptacles from wedging together and thus making it difficult to remove the individual receptacles successively from a nested stack, each of the receptacles has at least one internal stop shoulder to keep one receptacle from entering so far into another receptacle as to wedge therein. In the present embodiment of the invention, at least three internal stop shoulders 25 are provided at three respective junctures of the four side walls 10. When one receptacle is telescoped into a second receptacle, the lower portion of the first receptacle encounters the stop shoulders of the second receptacle and is thereby prevented from reaching a wedging position in the second receptacle.

A feature of the present embodiment of the invention is that each of the stop shoulders 25 is a triangular stop shoulder that is dimensioned to mate with a corresponding corner notch 16 in the base portion of a receptacle. Thus when one receptacle is nested into a second receptacle, the one receptacle comes at rest with the angular top edges of the corner notches 16 resting on the small triangular stop shoulders 25. See FIGS. 4 and 5 in which a first receptacle, shown in phantom nests into a second receptacle and the second receptacle nests into a third receptacle, the latter two receptacles being shown in full lines.

A further feature of the selected embodiment of the invention is the concept of providing at least one additional side opening in the receptacle immediately above the perforate bottom wall 12 for the admission of liquid nutrient into the lower interior of the receptacle and for aeration of the lower interior of the receptacle in the absence of a flood of liquid nutrient. In this instance, each of the four side walls 10 is formed with a weakened knock-out portion 30 immediately above the perforate bottom wall 12. Each of these knock-out portions is sufficiently fragile for removal by finger pressure.

The manner in which the invention serves its purpose may be readily understood from the foregoing description. FIG. 1 shows a receptacle with its knock-out portions 30 intact, the receptacle standing on a support surface provided by a sheet of glass 34. A number of receptacles are placed on such a sheet of glass during the period in which the plants in the receptacles mature sufficiently for sale, and later the receptacles may be displayed on such a sheet of glass until sold. Periodically the sheet of glass 34 is flooded to a suitable depth with a liquid 35. During the growing period, the liquid 35 supplies nutrient to the soil or other media in which the plant is rooted inside the receptacle. In some instances, the liquid may be plain water where sufficient nutrient is incorporated in the soil or other planting medium inside the receptacle. The liquid level is above the perforate bottom of the container and, therefore, the liquid flows freely under the container and upward through the perforate bottom wall into the interior of the container.

When the knock-out portions 30 are removed, as shown in FIG. 2, to form relatively large openings 32 in the four side walls 10, the liquid 35 enters these openings directly into the lower interior of the receptacle. Thus the relatively large openings 32 expedite the liquid treatment. When the flood of liquid 35 subsides, the large openings 32 provide for adequate aeration of the lower contents of the receptacle.

At the end of the initial growing period, no major root can extend through the bottom wall because of the small size of the bottom wall apertures. Hair roots do, however, extend through the small apertures. When the receptacle is transferred to a field for "hardening" of the plant, the hair roots continue to grow but the major roots are again prevented from extending through the bottom wall of the receptacle. When the receptacle is taken from the field in preparation for sale and the protruding root structure is removed, only the hair roots are scraped away with little effect on the vitality of the plant.

FIG. 6 shows how the receptacle may be formed with a bottom wall 12a instead of the previously described perforate bottom wall 12. The bottom wall 12a is a web that is continuous except for the provision of four relatively large apertures 36. This modification of the invention shown in FIG. 6 may be used for succulents which do not tend to send major roots through openings in the bottom wall of a receptacle.

My description in specific detail of the preferred practice of the invention will suggest various changes, substitutions and other departures from my disclosure within the spirit and scope of the appended claims.

I claim:

1. An open-topped receptacle for growing young plants and for displaying and selling the young plants, for example in self-service stores, said receptacle being a one-piece molded plastic receptacle of rectangular configuration in plan with four side walls and with a lower screen portion to permit liquid nutrients to reach the interior of the receptacle when the receptacle stands on a support surface and the support surface is flooded with the liquid nutrient, said receptacle being of tapered configuration to permit a plurality of the receptacles to be nested together compactly for storage and shipment prior to use, said receptacle having a triangular interior stop shoulder at a juncture of two of its side walls for abutment by a lower portion of a second receptacle nested therein, said stop shoulder being positioned to prevent insertion of the second receptacle to a wedging position whereby individual receptacles may be freely removed successively from a stack of nested receptacles.

2. An open-topped receptacle for growing young plants and for displaying and selling the young plants, for example in self-service stores, said receptacle being rectagular in horizontal cross section with four side walls and being made in one piece of a plastic material that is resistant to wire worms, said receptacle being of tapered configuration to permit a plurality of such receptacles to be nested compactly together for storage and shipment prior to use, said receptacle having at least one interior stop shoulder to keep a second receptacle from reaching a wedging position therein, said receptacle having a bottom wall in the form of a screen and having portions of said side walls extending below the perforate bottom wall to provide a base portion to space the screen above any support surface on which the receptacle may stand, said base portion being open on at least one side for flow of liquid nutrient under the screen and up through the screen into the interior of the receptacle when the support surface is flooded with liquid nutrient.

3. An open-topped receptacle as set forth in claim 2 in which there are at least three interior stop shoulders formed in the receptacle at three junctures, respectively, of the side walls of the receptacle, and in which said base portion is formed with lower notches at its four corners positioned and dimensioned to receive said stop shoulders.

4. An open-topped receptacle for growing young plants and for displaying and selling the young plants, for example in self-service stores, said receptacle being rectangular in horizontal cross section with four side walls and being made of a plastic material that is resistant to wire worms, said receptacle being of tapered configuration to permit a plurality of such receptacles to be nested compactly together for storage and shipment prior to use, said receptacle having at least one interior stop shoulder at the juncture of two of its side walls to keep a second receptacle from reaching a wedging position therein, said receptacle having a bottom wall in the form of a screen and having portions of said side walls extending below the bottom wall screen to provide a base portion to space the bottom wall screen above any support surface on which the receptacle may stand, said base portion being open on at least one side for flow of liquid nutrient under the bottom wall screen and up through the bottom wall screen into the interior of the receptacle when the support surface is flooded with liquid nutrient, at least one of said side walls having an opening therein immediately above the bottom wall screen for flow of nutrient into the interior of the receptacle when a support surface on which the receptacle stands is flooded with liquid nutrient and to provide for aeration of the lower contents of the receptacle when the support surface is not flooded.

5. An open-topped receptacle for growing young plants and for displaying and selling the young plants, for example in self-service stores, said receptacle being a thin-walled plastic receptacle rectangular in horizontal cross section with four side walls, said receptacle being of tapered configuration to permit a plurality of such receptacles to be nested compactly together for storage and shipment prior to use, said receptacle having at least one interior stop shoulder to keep a second receptacle from reaching a wedging position therein, said receptacle having a bottom wall in the form of a screen and having portions of said side walls extending below the bottom wall screen to provide a base portion to space the bottom wall screen above any support surface on which the receptacle may stand, said base portion being open on at least one side for flow of liquid nutrient under the bottom wall screen and up through the bottom wall screen into the interior of the receptacle when the support surface is flooded with liquid nutrient, at least one of said side walls having a weakened knock-out portion extending above the bottom wall screen for removal by finger pressure to provide a side opening in the receptacle for flow of liquid nutrient therethrough into the receptacle and for aeration of the lower contents of the receptacle in the absence of the liquid nutrient.

6. A combination as set forth in claim 4 in which said bottom wall has numerous perforations no greater than $5/32$ of an inch in dimension to prevent a major root of a plant from extending through the bottom wall.

7. An open-topped receptacle for growing young plants and for displaying and selling the young plants, for example in self-service stores, said receptacle being rectangular in horizontal cross section with four side walls and being made of a plastic material, said receptacle being of tapered configuration to permit a plurality of such receptacles to be nested compactly together for storage and shipment prior to use, said receptacle having at least one interior stop shoulder at the juncture of two of its side walls to keep a second receptacle from reaching a wedging position therein, said receptacle having a perforate bottom wall of screen-like character and having portions of said side walls extending below the perforate bottom wall to provide a base portion to space the perforate bottom wall above any support surface on which the receptacle may stand, said base portion being open on at least one side for flow of liquid nutrient under the perforate bottom wall and up through the bottom wall into the interior of the receptacle when the support surface is flooded with liquid nutrient, at least one of said sidewalls being reduced in thickness to make the side wall relatively thin in the region near and above said bottom wall, the thinned side wall having a weakened knock-out portion extending above the bottom wall for removal by finger pressure to provide a side opening in the receptacle for flow of nutrient therethrough into the receptacle and for aeration of the lower contents of the receptacle in the absence of liquid nutrient.

References Cited in the file of this patent
UNITED STATES PATENTS

| | | |
|---|---|---|
| 758,678 | Muller | May 3, 1904 |
| 1,998,637 | Radley | Apr. 23, 1935 |
| 2,281,068 | Farnham | Apr. 28, 1942 |
| 2,592,976 | Thomas | Apr. 15, 1952 |
| 2,655,283 | Moldt | Oct. 13, 1953 |
| 2,810,234 | Blackburn | Oct. 22, 1957 |
| 2,814,427 | Emery | Nov. 26, 1957 |
| 2,893,167 | Davidson | July 7, 1959 |